(12) United States Patent
Forgang

(10) Patent No.: US 9,146,334 B2
(45) Date of Patent: Sep. 29, 2015

(54) METHOD OF PHASE SYNCHRONIZATION OF MWD OR WIRELINE APPARATUS SEPARATED IN THE STRING

(75) Inventor: Stanislav W. Forgang, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 698 days.

(21) Appl. No.: 13/231,517

(22) Filed: Sep. 13, 2011

(65) Prior Publication Data

US 2013/0066557 A1    Mar. 14, 2013

(51) Int. Cl.
*G01V 3/30* (2006.01)
*G01V 11/00* (2006.01)

(52) U.S. Cl.
CPC .................. *G01V 11/002* (2013.01)

(58) Field of Classification Search
USPC ............... 702/6, 11, 17, 85, 106, 191
See application file for complete search history.

(56) References Cited

U.S. PATENT DOCUMENTS

| | | | |
|---|---|---|---|
| 4,052,662 A * | 10/1977 | Rau | 324/338 |
| 5,260,660 A * | 11/1993 | Stolarczyk | 324/338 |
| 5,600,246 A | 2/1997 | Forgang et al. | |
| 6,400,646 B1 | 6/2002 | Shah et al. | |
| 6,424,595 B1 | 7/2002 | Chenin | |
| 6,661,375 B2 | 12/2003 | Rickett et al. | |
| 6,777,940 B2 | 8/2004 | Macune | |
| 6,912,465 B2 | 6/2005 | Collins et al. | |
| 7,142,129 B2 | 11/2006 | Hall et al. | |
| 8,514,098 B2 * | 8/2013 | Montgomery et al. | 340/855.4 |
| 2005/0183887 A1 | 8/2005 | Rodney | |
| 2006/0180349 A1 | 8/2006 | Dashevskiy | |
| 2010/0302060 A1 * | 12/2010 | Montgomery et al. | 340/853.7 |
| 2011/0205080 A1 * | 8/2011 | Millot et al. | 340/854.4 |

FOREIGN PATENT DOCUMENTS

WO    WO 2009/029517 A2    3/2009

OTHER PUBLICATIONS

G. Heisig et al., "Downhole Diagnosis of Drilling Dynamics Data Provides New Level Drilling Process Control to Drill", SPE 49206, 1998.

* cited by examiner

*Primary Examiner* — Mohamed Charioui
(74) *Attorney, Agent, or Firm* — Mossman Kumar & Tyler PC

(57) ABSTRACT

The present disclosure is related to apparatuses and methods for estimating a phase offset in earth formations. The method may include estimating the phase offset by comparing signals generated and received by a first sub, the second signal being transmitted by a second sub that has been synchronized by the signal generated by the first sub. The signals may be exchanged using a first antenna on the first sub and a second antenna on the second sub. The signals may use a selected frequency. Synchronization may take place without electrical communication between the first and second subs. The method may include compensating for a propagation delay in the signals using the phase offset. The method may include using a time stamp during the synchronization. The apparatus may include a first antenna and a second antenna on first and second subs, respectively, both configured to transmit and receive electromagnetic signals.

19 Claims, 5 Drawing Sheets

FIG. 4

METHOD OF PHASE SYNCHRONIZATION OF MWD OR WIRELINE APPARATUS SEPARATED IN THE STRING

FIELD OF THE DISCLOSURE

The present disclosure is related to exploration and production of hydrocarbons involving investigations of regions of an earth formation penetrated by a borehole.

BACKGROUND OF THE DISCLOSURE

Hydrocarbon exploration and production typically involves using downhole tools in boreholes penetrating earth formations. These downhole tools may include multiple subs. Operation of the subs, particularly in borehole logging, may be improved by synchronization of two or more subs. The downhole conditions and tool configurations may not allow direct electrical, hydraulic, or acoustic communications between two or more of the subs. It would be advantageous to have the ability to synchronize subs under conditions where conventional downhole communications are unreliable or prevented.

SUMMARY OF THE DISCLOSURE

In aspects, the present disclosure generally relates to exploration and production of hydrocarbons involving investigations of regions of an earth formation penetrated by a borehole. More specifically, the disclosure relates synchronizing subs without the need for electrical communication between the subs.

One embodiment according to the present disclosure includes a method of estimating a phase offset between signals generated by subs positioned downhole in an earth formation in at least one borehole penetrating an earth formation, comprising: estimating the phase offset by comparing a first signal with a second signal, the first signal being generated by a first sub and configured to synchronize a second sub with the first sub, the second signal being received from the synchronized second sub.

Another embodiment according to the present disclosure includes an apparatus for synchronization in an earth formation, comprising: a first sub configured for downhole conveyance; a first antenna disposed on the first sub and configured to generate a first signal at a selected frequency; a second sub configured for downhole conveyance; a second antenna disposed on the second sub and configured to generate a second signal at the selected frequency; and at least one processor configured to synchronize the first sub with the second sub using the first signal and configured to estimate a phase offset using the first signal as transmitted by the first antenna and the second signal as received by the first antenna.

Another embodiment according to the present disclosure includes a non-transitory computer-readable medium product having instructions stored thereon that, when executed by at least one processor, perform a method, the method comprising: estimating the phase offset by comparing a first signal with a second signal, the first signal being generated by a first sub and configured to synchronize a second sub with the first sub and the second signal being received from the synchronized second sub.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such development efforts may be complex and time-consuming, outside the knowledge base of typical laymen, but would nevertheless be a routine undertaking for those of ordinary skill in the relevant fields.

Figure 1:
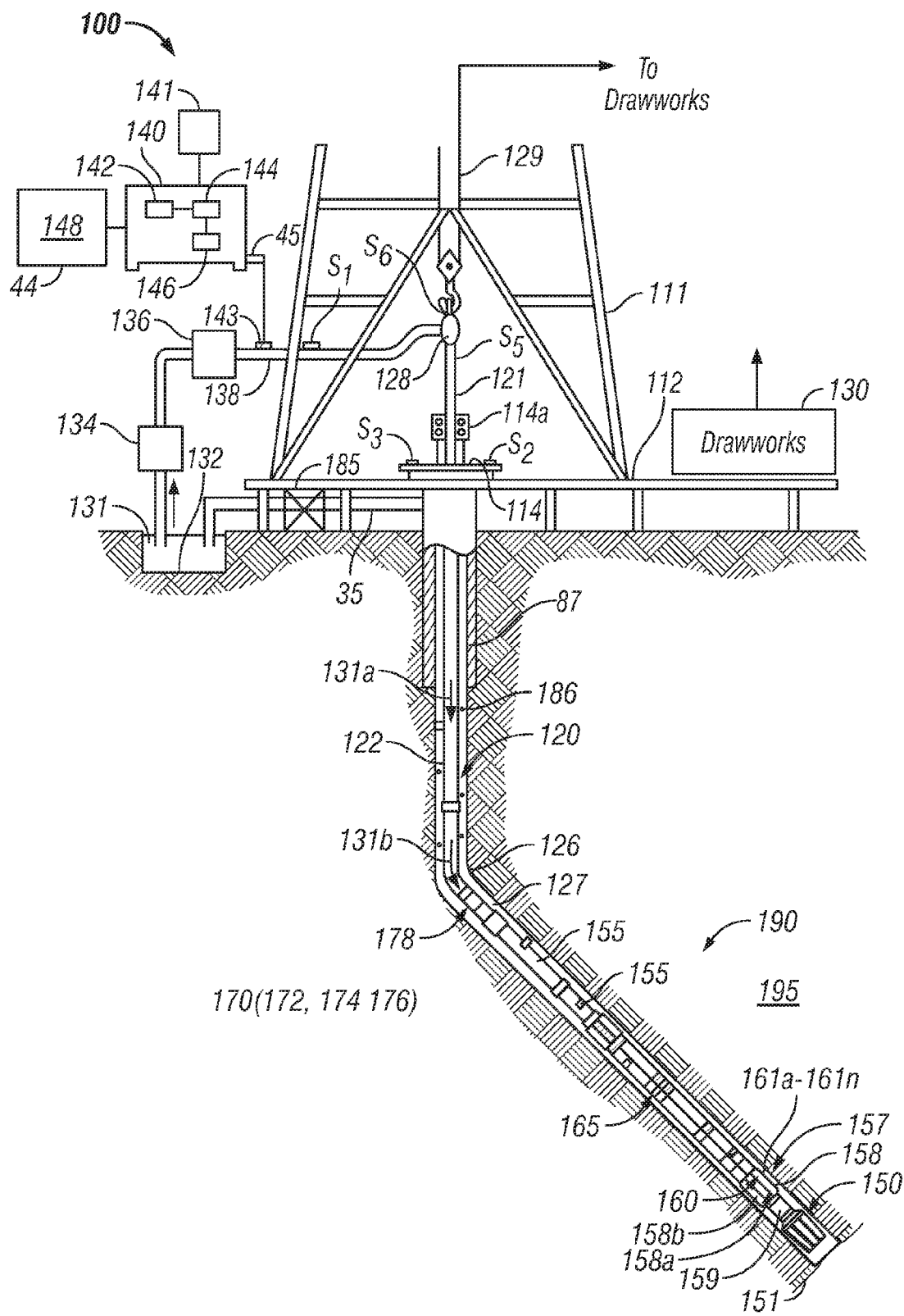
FIG. 1 depicts an exemplary bottom hole assembly (BHA) with at least two subs deployed within a borehole according to the present disclosure.

FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottom-hole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe) 122, having the drilling assembly 190, attached at its bottom end extends from the surface to the bottom 151 of the borehole 126. A drill bit 150, attached to BHA 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. Herein, the term "information" may related to, but is not limited to, raw data, processed data, and signals. A surface torque sensor $S_2$ and a sensor $S_3$ associated with the drill string 120 respectively provide information about the torque and the rotational speed of the drill string 120. Tubing injection speed is determined from the sensor $S_5$, while the sensor $S_6$ provides the hook load of the drill string 120.

In some applications, the drill bit 150 is rotated by only rotating the drill pipe 122. However, in many other applications, a downhole motor 155 (mud motor) disposed in the BHA 190 also rotates the drill bit 150. The rate of penetration for a given BHA 190 largely depends on the WOB or the thrust force on the drill bit 150 and its rotational speed.

The mud motor 155 is coupled to the drill bit 150 via a drive shaft disposed in a bearing assembly 157. The mud motor 155 rotates the drill bit 150 when the drilling fluid 131 passes through the mud motor 155 under pressure. The bearing assembly 157, in one aspect, supports the radial and axial forces of the drill bit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided to the surface control unit 140. The surface control unit 140 displays desired drilling parameters and other information on a display/monitor 142 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the earth formation 195 surrounding the drilling assembly 190. Such sensors are generally known in the art and for convenience are generally denoted herein by numeral 165. The BHA 190 may further include a variety of other sensors and devices 159 for determining one or more properties of the BHA (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.) For convenience, all such sensors are denoted by numeral 159.

The drilling assembly 190 includes a steering apparatus or tool 158 for steering the drill bit 150 along a desired drilling path. In one aspect, the steering apparatus may include a steering unit 160, having a number of force application members 161a-161n, wherein the steering unit is at partially integrated into the drilling motor. In another embodiment the steering apparatus may include a steering unit 158 having a bent sub and a first steering device 158a to orient the bent sub in the wellbore and the second steering device 158b to maintain the bent sub along a selected drilling direction.

The MWD system may include sensors, circuitry and processing software and algorithms for providing information about desired dynamic drilling parameters relating to the BHA 190, drill string 120, the drill bit 150 and downhole equipment such as a drilling motor, steering unit, thrusters, etc. Exemplary sensors include, but are not limited to, drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED. Suitable systems are also discussed in "Downhole Diagnosis of Drilling Dynamics Data Provides New Level Drilling Process Control to Driller", SPE 49206, by G. Heisig and J. D. Macpherson, 1998.

The drilling system 100 can include one or more downhole processors at a suitable location such as 193 on the BHA 190. The processor(s) can be a microprocessor that uses a computer program implemented on a suitable machine readable medium that enables the processor to perform the control and processing. The machine readable medium may include ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate formation lithology. While a drill string 120 is shown as a conveyance system for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. A downhole assembly (not shown) may include a bottomhole assembly and/or sensors and equipment for implementation of embodiments of the present disclosure on either a drill string or a wireline.

Figure 2:
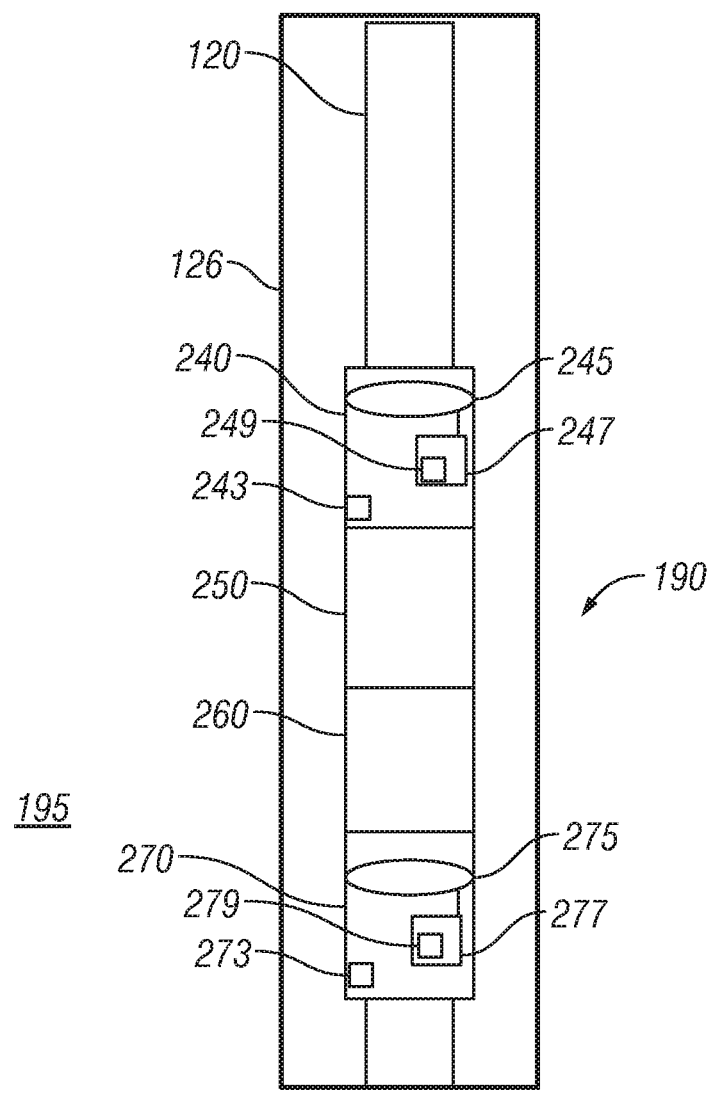
FIG. 2 shows the at least two subs in more detail.

FIG. 2 shows the BHA 190 with sensor/evaluation devices 165 separated into multiple subs 240, 250, 260, 270. A first sub 240 may include an antenna 245 configured to transmit and receive electromagnetic signals. The first sub 240 may include a first transceiver 247 configured to transmit and receive signals through antenna 245. The first transceiver 247 may include a synchronizable clocking circuit 249. A second sub 270 may also include an antenna 275 configured to transmit and receive electromagnetic signals. The second sub 270 may include a second transceiver 277 configured to transmit and receive signals through antenna 275. In operation, the first transceiver 247 may be configured to transmit a first electromagnetic signal, such as but not limited to a radio signal, at a selected frequency. The second transceiver 277 may be configured to receive the first electromagnetic signal and transmit a second electromagnetic signal at the same selected frequency. First transceiver 247 may be configured to estimate a phase shift between the first electromagnetic signal and the second electromagnetic signal. Phase shifting may be due propagation delays a result of the distance between the first transceiver 247 and the second transceiver 277. In some embodiments, second transceiver 277 may also include a clocking circuit 279. The intervening subs 250,260 may be configured such that electrical communication is not available between the first sub 240 and the second sub 270. In some embodiments, there may not be intervening subs 250, 260. In some embodiments, the first sub 240 and the second sub 270 may be separated by a length of the drill string 120. In some embodiments, the first sub 240 may include a formation evaluation (FE) sensor 243 in communication with first transceiver 247. In some embodiments, the second sub 270 may include an FE sensor 273 in communication with second transceiver 277.

Figure 3:
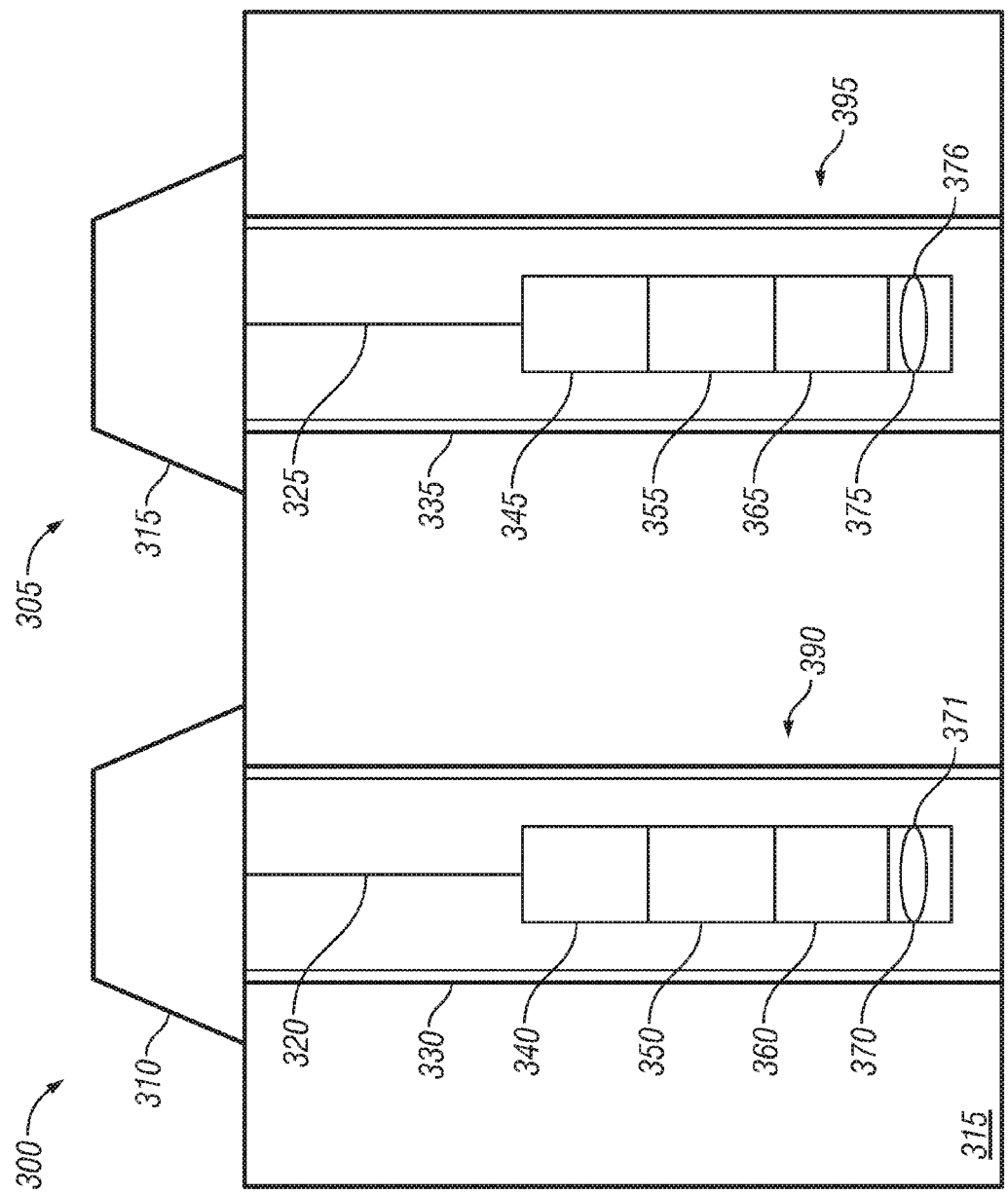
FIG. 3 depicts an exemplary pair of BHAs for communication between two boreholes according to the present disclosure.

FIG. 3 shows embodiment according to the present disclosure with synchronization between boreholes. FIG. 1 shows exemplary hydrocarbon wells 300, 305. The hydrocarbon wells 300, 305 may include a derrick 310, 315 configured to support a carrier 320, 325. The carriers 320, 325 may be configured to convey BHAs 390, 395 in a borehole 330, 335 penetrating earth formation 395. The BHA 390 may include multiple subs 340, 350, 360, 370 that may be configured to house downhole investigation devices. Similarly, BHA 395, may include multiple subs 345, 355, 365, 375 that may be configured to house downhole investigation devices. A first sub 370 on BHA 390 may include an antenna 371 configured to transmit and receive electromagnetic signals. A second sub 375 on BHA 395 may also include an antenna 376 configured to transmit and receive electromagnetic signals. One or more of intervening subs 340, 350, 360, 345, 355, 365 may be configured such that electrical communication is not available between the first sub 370 and the second sub 375. In some embodiments, there may not be intervening subs 340, 350, 360, 345, 355, 365. In some embodiments, the first sub 370 and the second sub 375 may be separated by a length of the carrier 320. While a wireline conveyance system has been shown, it should be understood that embodiments of the present disclosure may be utilized in connection with tools conveyed via rigid carriers (e.g., jointed tubular or coiled tubing) as well as non-rigid carriers (e.g., wireline, slickline, e-line, etc.). Some embodiments of the present disclosure may be deployed along with LWD/MWD tools.

Figure 4:
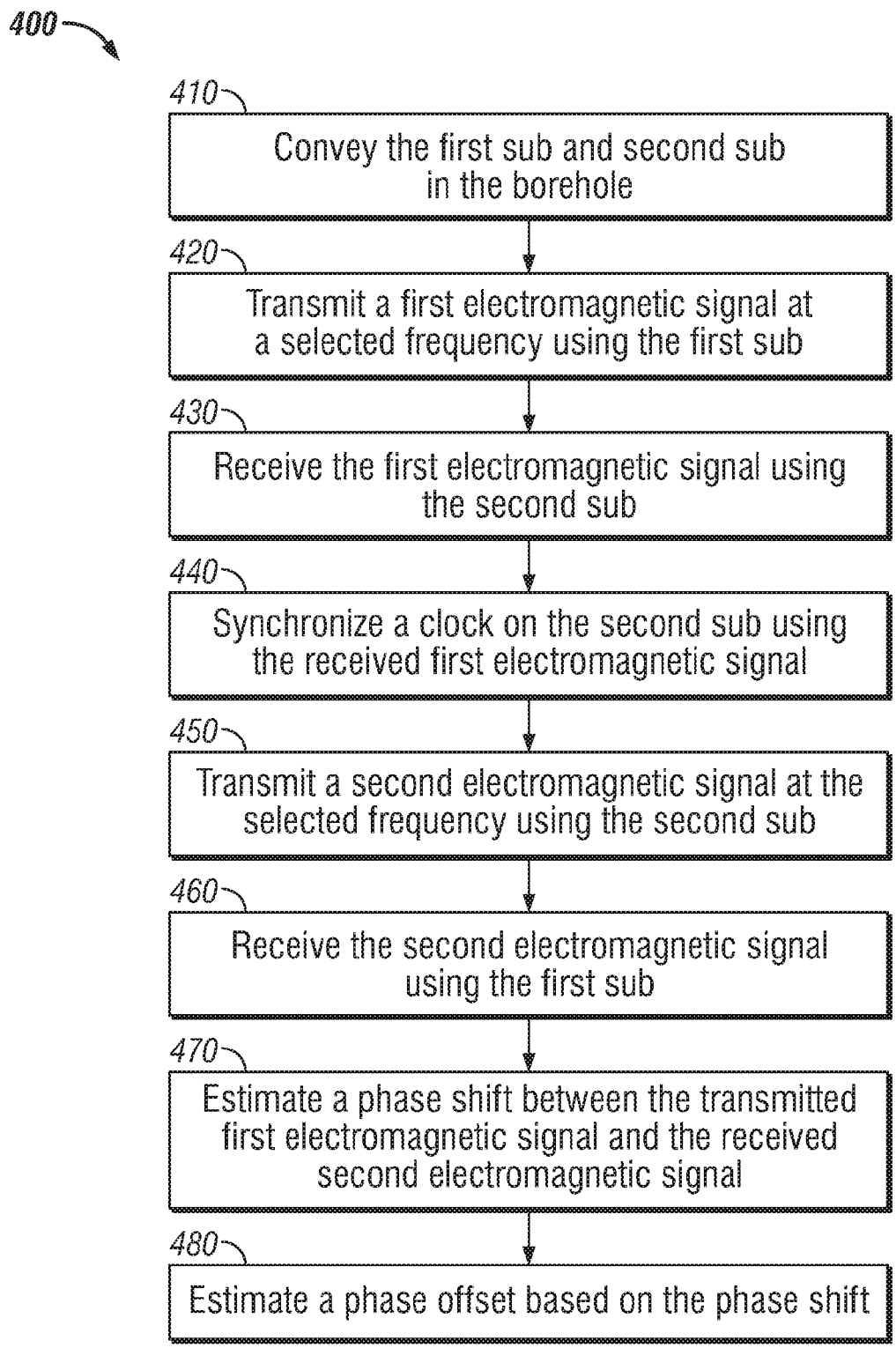
FIG. 4 is a flow chart illustrating some of the steps of a method of one embodiment according to the present disclosure.

FIG. 4 shows a flow chart that summarizes an exemplary method 400 of one embodiment according to the present disclosure. In step 410, first sub 240 and second sub 270 on BHA 190 may be conveyed in the borehole 126. In the borehole 126, a first sub 240 and a second sub 270 may be unable to communicate electrically. In step 420, first transceiver 247 may transmit a first electromagnetic signal at a selected frequency using antenna 245. In step 430 the first electromagnetic signal may be received by a second transceiver 277 using antenna 275 on a second sub 270. In step 440, a clock 279 associated with the second transceiver 277 may be synchronized using the first electromagnetic signal. The synchronization may include synchronizing one or more of: phase and time. In step 450, the synchronized second transceiver 277 may transmit a second electromagnetic signal at the same selected frequency as the first electromagnetic signal. In step 460, the first transceiver 240 on first sub 240 may receive the second electromagnetic signal via antenna 245. In step 470, first sub 240 may estimate a phase shift between the transmitted first electromagnetic signal and the received second electromagnetic signal. The phase shift may be due to a propagation delay. In step 480, a phase offset may be estimated using the phase shift. The phase offset may be used to compensate for propagation delays in measurement information. In some embodiments, the synchronization may include using a time stamp including in the second electromagnetic signal. In some embodiments, the method may be reversed such that the second sub 270 and the first sub 240 may exchange roles. In embodiments including subs located in different boreholes, step 410 may include conveying the first sub in a first borehole and conveying a second sub in a second borehole.

In one embodiment of the disclosure, measurements made by a formation evaluation (FE) sensor on the first sub 240 may be transmitted with a timestamp to the second sub 270. This makes it possible to ensure proper registration of measurements made by different FE sensors on different subs. The registration may be done by the downhole processor or a surface processor.

Figure 5:
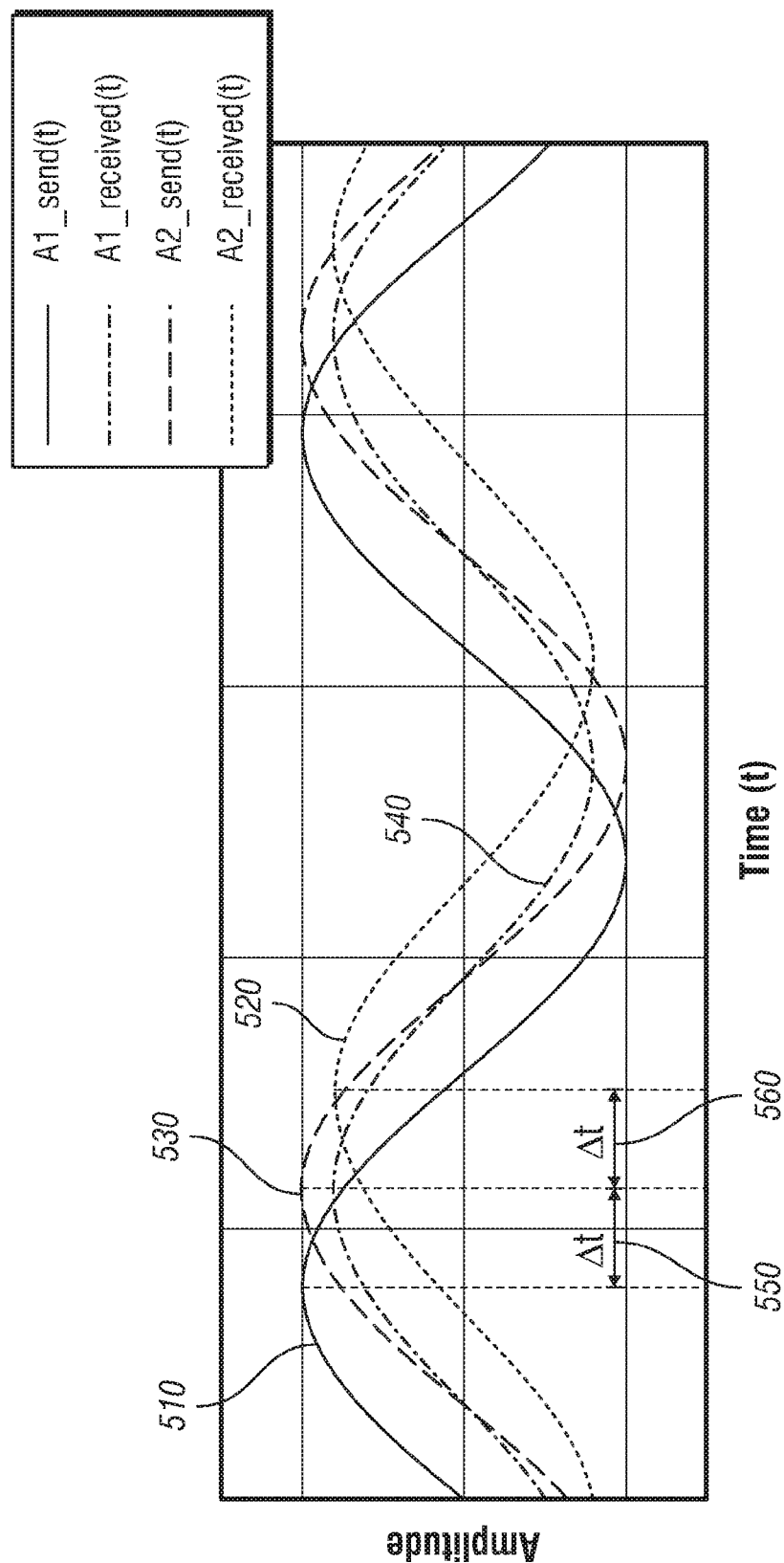
FIG. 5 shows a graph illustrating transmitted and received electromagnetic signals for one embodiment according to the present disclosure.

FIG. 5 shows a graph of the signals transmitted and received by the transceivers according to one embodiment of the present disclosure. The first electromagnetic signal, represented by curve 510, may be sent from the first transceiver 247. Curve 520 represents the first electromagnetic signal as received by the second transceiver 277. Curve 530 represents the second electromagnetic signal transmitted from the second transceiver 277, now synchronized, at the same frequency as the first electromagnetic signal. In some embodiments, the first and second electromagnetic signals may have substantially similar frequencies instead of identical frequencies. Curve 540 represents the second electromagnetic signal as received by the first transceiver 247. The time delay 550 indicates the phase shift between the transmission curve 510 and reception curve 520, and time delay 560 indicates the phase shift between transmission curve 530 and reception curve 540. This phase shift may be indicative of the propagation delay. The actual propagation delay between the transmission of signal 510 and reception of signal 540 may be estimated by the combination of time delay 550 and time delay 560. While the transmission curves indicate that the first and second electromagnetic signals were sent at the same amplitude, this is merely exemplary, and the electromagnetic signals may be sent with different amplitudes.

Using the electromagnetic reciprocity principle, if two transceivers operate at the same frequency $f_0$ and are separated by distance L while both are placed in a medium with propagation constant $\gamma=\alpha+i\beta$ where $\alpha$—attenuation constant and $\beta$—phase constant, both apparently frequency dependent (and, presumably, positive). The followings could be observed: 1) the phase shift due to propagation delay when the first transceiver is transmitting the first electromagnetic wave and the second transceiver is receiving could be expressed as $\Delta\Phi_{1-2}=\beta\cdot L$; 2) the phase shift due to propagation delay when the second transceiver is transmitting the second electromagnetic wave and the first transceiver is receiving could be expressed as $\Phi_{2-1}=\beta\cdot L$; and 3) while the formation properties and geometry remain unchanged, $\Delta\Phi_{1-2}=\Delta\Phi_{2-1}$ and, therefore, total propagation delay between electromagnetic waves emitted and received by the first transceiver may be expressed as $2\cdot\Delta\Phi_{1-2}$. Thus, one of skill in the art would see that the time delay 550 may be equal to time delay 560. With a known time delay/phase shift, the first transceiver may be used as a reference for other transceivers since the propagation delays in measurement information from the other synchronized receivers may be compensated for using a phase offset estimated through the disclosed synchronization method.

Implicit in the processing of the data is the use of a computer program implemented on a suitable machine-readable medium that enables the processor to perform the control and processing. The machine readable medium may include ROMs, EPROMs, EAROMs, Flash Memories and Optical disks. The determined formation properties may be recorded on a suitable medium and used for subsequent processing upon retrieval of the BHA. The determined formation properties may further be telemetered uphole for display and analysis.

While the foregoing disclosure is directed to the one mode embodiments of the disclosure, various modifications will be apparent to those skilled in the art. It is intended that all variations be embraced by the foregoing disclosure.

What is claimed is:

1. A method of estimating a phase offset between signals generated by subs positioned downhole in an earth formation in at least one borehole penetrating an earth formation, comprising:
   estimating the phase offset by comparing a first signal with a second signal, the first signal being generated by a first sub and configured to synchronize a second sub with the first sub, the second signal being received from the synchronized second sub prior to estimating the phase offset.

2. The method of claim 1, further comprising:
   transmitting a first signal at a selected frequency using the first sub;
   receiving the first signal at the second sub;
   synchronizing a second signal generated by the second sub with the received first signal;
   transmitting the second signal at the selected frequency with the second sub; and
   receiving the second signal at the first sub prior to estimating the phase offset.

3. The method of claim 1, further comprising:
   estimating a phase shift between the generation of the first signal by the first sub and the reception of the second signal at the first sub.

4. The method of claim 1, wherein the first sub and the second sub are located in a borehole in the earth formation.

5. The method of claim 1, wherein the first sub is located in a first borehole in the earth formation and the second sub is located in a second borehole in the earth formation.

6. The method of claim 1, wherein synchronizing includes:
   adjusting the phase of at least one of the two signals to compensate for a propagation delay.

7. The method of claim 1, further comprising:
   compensating for a propagation delay in the measurement information acquired by at least one of the subs.

8. The method of claim 1, wherein the first sub is electrically isolated from the second sub.

9. The method of claim 1, wherein the first sub and the second sub each includes an antenna configured for transmitting and receiving the electromagnetic signals.

10. The method of claim 3, wherein:
    the phase shift is due to at least a propagation delay in the measurement information acquired by at least one of the subs.

11. The method of claim 1, further comprising:
    compensating the measurement information acquired by at least one of the subs using the estimated phase offset; and
    evaluating the earth formation using the compensated measurement information.

12. An apparatus for synchronization in an earth formation, comprising:
    a first sub configured for downhole conveyance;
    a first antenna disposed on the first sub and configured to generate a first signal at a selected frequency;
    a second sub configured for downhole conveyance;
    a second antenna disposed on the second sub and configured to generate a second signal at the selected frequency; and
    at least one processor configured to synchronize the first sub with the second sub using the first signal and configured to estimate a phase offset using the first signal as transmitted by the first antenna and the second signal as received by the first antenna.

13. The apparatus of claim 12, wherein the first sub is located in a first borehole in the earth formation and the second sub is located in a second borehole in the earth formation.

14. The apparatus of claim 12, wherein the first sub and the second sub are located in a borehole in the earth formation.

15. The apparatus of claim 12, wherein the at least one processor is further configured to:
    compensate for a propagation delay in measurement information transmitted from the second sub to the first sub using the phase offset.

16. The apparatus of claim 12, wherein the first sub is electrically isolated from the second sub.

17. The apparatus of claim 12, further comprising:
    at least one formation evaluation sensor disposed on the first sub and configured to make a measurement indicative of at least one property of the earth formation, and wherein the processor is further configured to provide a timestamp to a transmitted signal indicative of the measurement.

18. A non-transitory computer-readable medium product having instructions stored thereon that, when executed by at least one processor, perform a method, the method comprising:
    estimating the phase offset by comparing a first signal with a second signal, the first signal being generated by a first sub and configured to synchronize a second sub with the first sub and the second signal being received from the synchronized second sub prior to estimating the phase offset.

19. The non-transitory computer-readable medium product of claim 18 further comprising at least one of: (i) a ROM, (ii) an EPROM, (iii) an EEPROM, (iv) a flash memory, and (v) an optical disk.

* * * * *